United States Patent
Rutherford et al.

(10) Patent No.: US 12,330,380 B2
(45) Date of Patent: Jun. 17, 2025

(54) HYBRID ELECTROFUSION PROCESSOR

(71) Applicant: Georg Fischer Central Plastics LLC, Shawnee, OK (US)

(72) Inventors: Roger Rutherford, Shawnee, OK (US); Michael D. Smith, Shawnee, OK (US)

(73) Assignee: Georg Fischer Central Plastics LLC, Shawnee, OK (US)

( * ) Notice: Subject to any disclaimer, the term of this patent is extended or adjusted under 35 U.S.C. 154(b) by 157 days.

(21) Appl. No.: 17/993,326

(22) Filed: Nov. 23, 2022

(65) Prior Publication Data
US 2024/0165893 A1    May 23, 2024

(51) Int. Cl.
*B29C 65/00*    (2006.01)
*B29L 23/24*    (2006.01)

(52) U.S. Cl.
CPC .......... *B29C 66/95* (2013.01); *B29C 66/5221* (2013.01); *B29C 66/8748* (2013.01); *B29L 2023/24* (2013.01)

(58) Field of Classification Search
CPC . B29C 66/95; B29C 66/5221; B29C 66/8748; B29C 65/3468; B29C 66/5229; B29C 66/73921; B29C 66/841; B29C 66/8414; B29C 66/8618; B29L 2023/24; F16L 47/03
See application file for complete search history.

(56) References Cited

U.S. PATENT DOCUMENTS

| | | | |
|---|---|---|---|
| 5,138,136 A | 8/1992 | Moreau et al. | |
| 5,908,575 A | * 6/1999 | Smith | B29C 66/8618 219/661 |
| 6,441,352 B1 | 8/2002 | Groft et al. | |
| 2001/0023869 A1 | 9/2001 | Sauron et al. | |
| 2006/0037953 A1 | 2/2006 | Matthews et al. | |

FOREIGN PATENT DOCUMENTS

| | | |
|---|---|---|
| CH | 688887 A5 | 5/1998 |
| EP | 1266745 A2 | 12/2002 |
| IT | 201600101620 A1 | 4/2018 |
| JP | 11254535 A2 | 9/1999 |
| JP | 2018128067 A * | 8/2018 |
| JP | 2019062699 A | 4/2019 |
| WO | 2021245419 A1 | 12/2021 |

* cited by examiner

*Primary Examiner* — S. Behrooz Ghorishi
(74) *Attorney, Agent, or Firm* — Harness, Dickey & Pierce, P.L.C.

(57) ABSTRACT

A hybrid electrofusion processor selectively operating on either battery power or AC power.

7 Claims, 4 Drawing Sheets

HYBRID ELECTROFUSION PROCESSOR

FIELD

The present disclosure relates to heating devices and, more particularly, to devices known as the electrofusion processors for welding plastic pipes together.

BACKGROUND

This section provides background information related to the present disclosure which is not necessarily prior art.

Electrofusion processors are well-known devices for welding together two plastic pipes. One class of electrofusion processors uses AC power whereas another class of electrofusion processors use DC power. The AC powered processors suffer from various disadvantages such as being cumbersome to you be used in the field as an AC generator is often necessary to be carried to the site The DC powered processors have their own set of problems such as having limited battery capacity that may not be sufficient to provide a satisfactory weld.

SUMMARY

This section provides a general summary of the disclosure and is not a comprehensive disclosure of its full scope or all of its features.

According to the preferred embodiment of this invention, a hybrid approach is disclosed. Normal operations begin with attempting to use the DC power to heat the electrofusion coils in the coupler. It should be understood that the present invention can also be used on electrofusion fittings such as electrofusion saddle fittings and the term "coupler" as used herein should be construed to cover both couplers and fittings. However, before starting the fusion process, a test is made to determine whether the DC power source has enough energy to deliver a sufficient amount of current to the electrofusion coils in the coupler to provide a satisfactory weld. If not, the user is directed to switch to an alternate AC power source.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
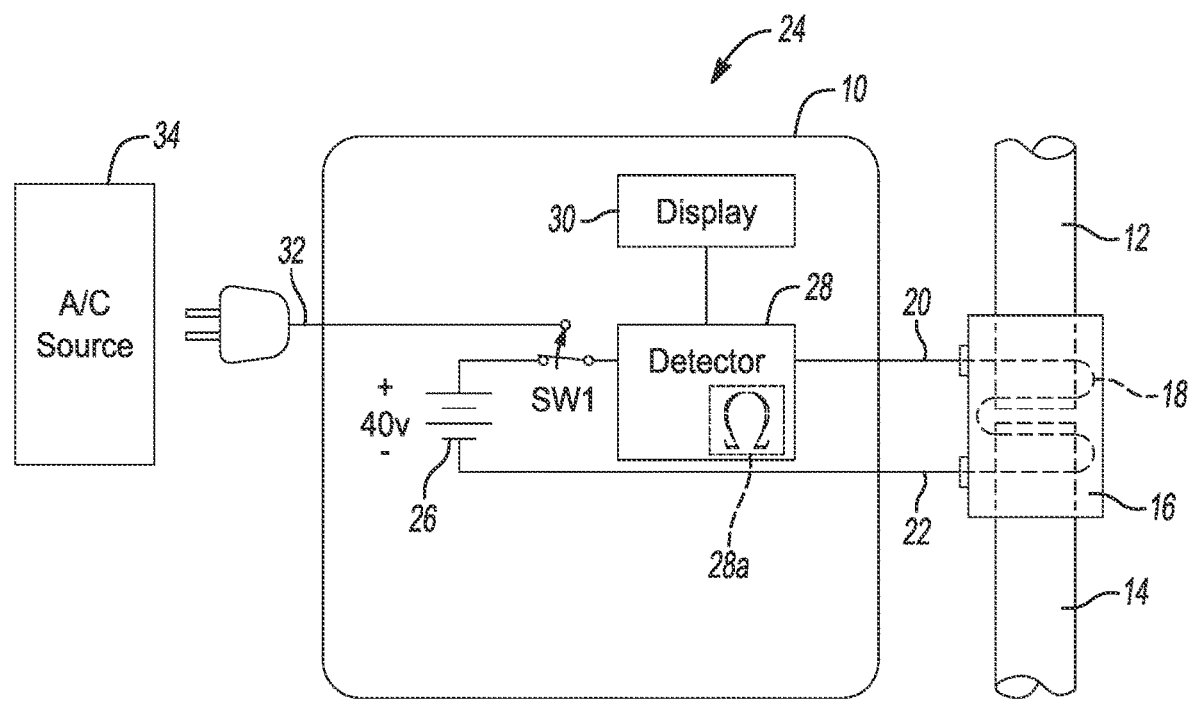
FIG. 1 is a block diagram of a hybrid electrofusion processor made in accordance with the teachings of this invention, showing the one size of an electrofusion coupler.

Turning now to FIG. 1, a schematic representation of an electrofusion processor 10 is illustrated for welding together plastic pipes 12 and 14. An electrofusion coupler 16 surrounds the closely abutting ends of pipes 12 and 14. As is known in the art, the electrofusion coupler 16 includes a coil 18 to supply energy in the form of heat to weld the coupler 16 to the ends of the pipes 12 and 14 to secure them together.

Figure 3:
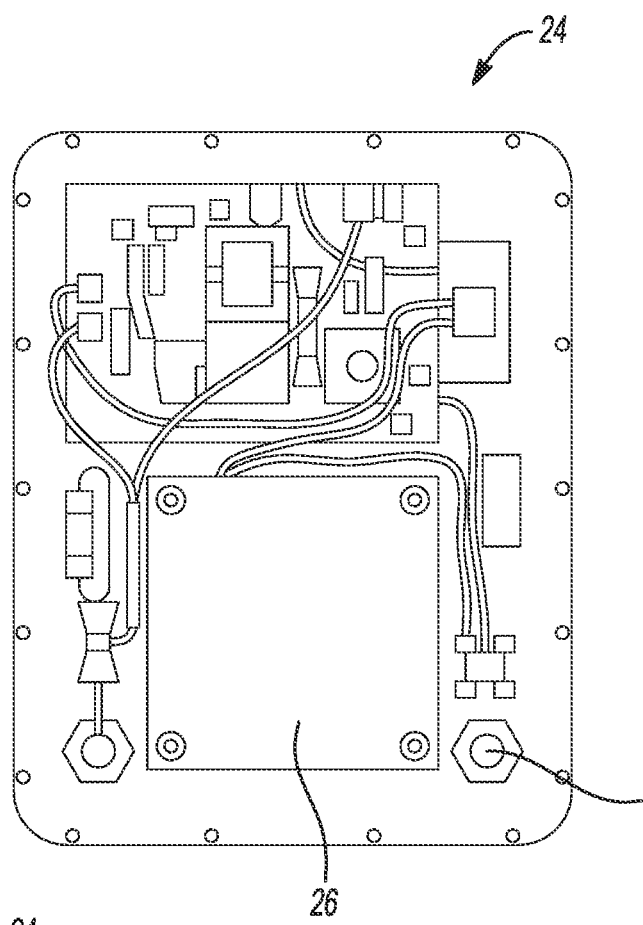
FIG. 3 is a plan view pictorially illustrating internal parts the electrofusion processor.
Figure 4:
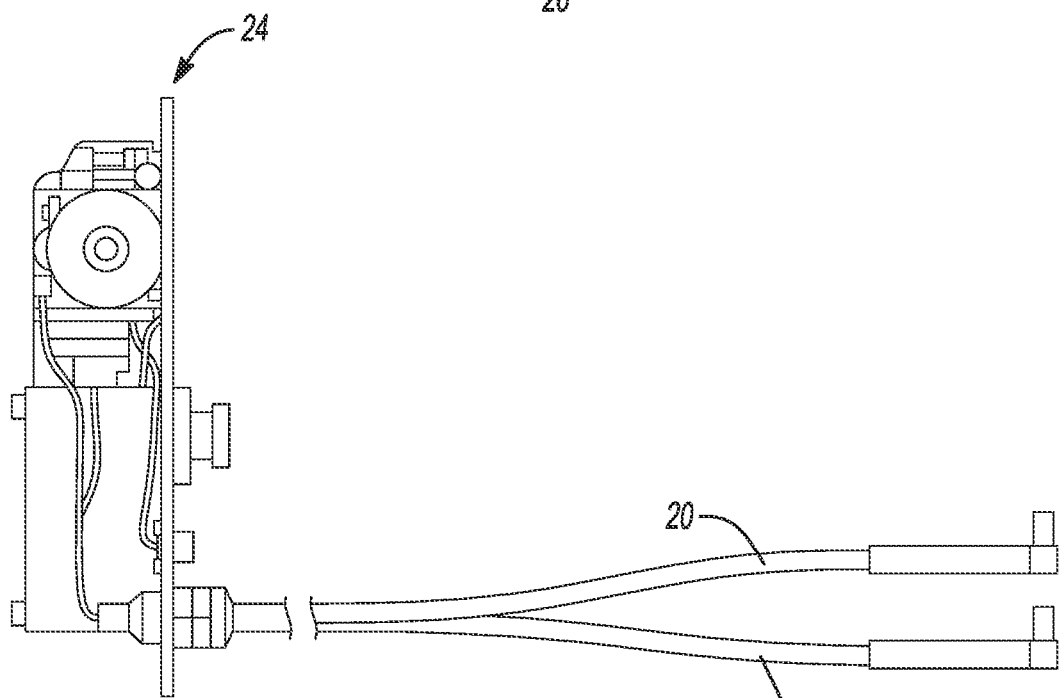
FIG. 4 is a side view of the electrofusion processor.
Figure 5:
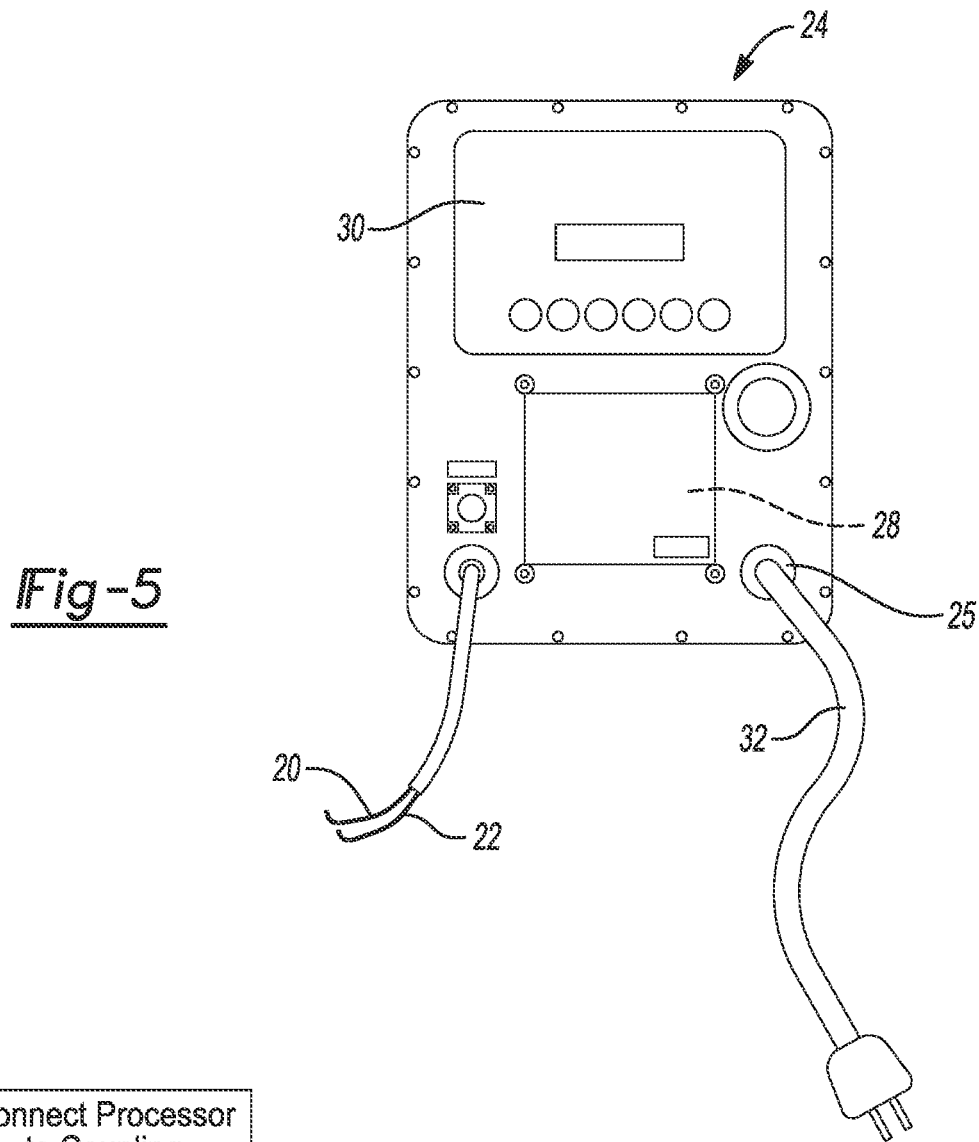
FIG. 5 is a front plan view of the electrofusion processor.

Leads 20 and 22 connect the processor 10 to opposite ends of the coil 18. As will be, more apparent by way of reference to FIGS. 3-5, the processor 10 is housed in a portable case 24. The case includes a battery 26, typically supplying 40 Volts DC, detector circuitry 28 including an ohmmeter 28a and a display 30. A power cable 32 is optionally connectable to the case 24. The power cable 32 is used to supply alternating current (AC) power from AC source 34, if necessary, as an alternative or booster to the energy supplied by battery 26. The AC source 34 can be a portable generator that can be carried to the site and plugged into the input jack 25 in the case 24, if necessary.

Figure 6:
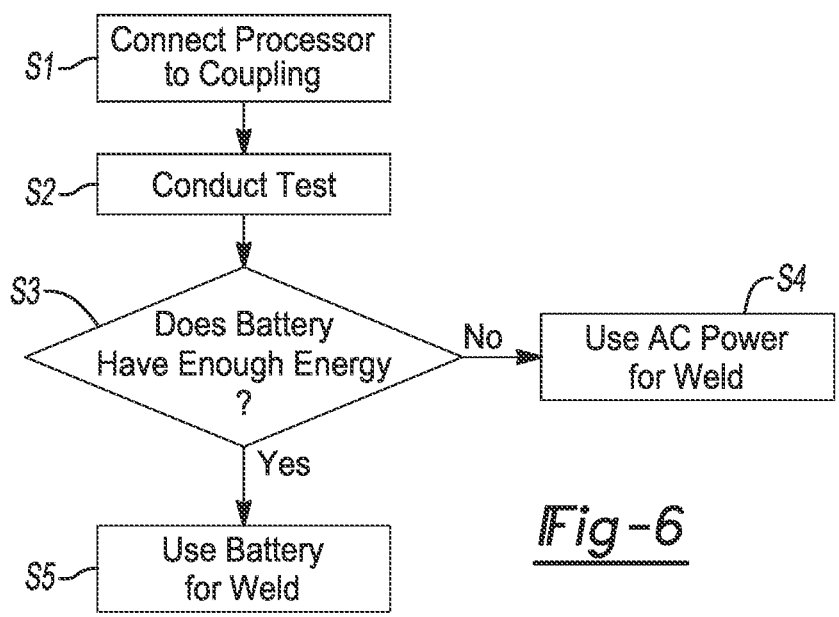
FIG. 6 is a flowchart illustrating a broad overview of the sequence of operation in steps S1-S5 for the electrofusion processor.

With reference to FIG. 6, the general operation of the electrofusion processor 10 will be described. In step S1, the leads 20 and 22 are connected to the coupler coil 18 of the electrofusion coupler 16. This completes a circuit through detector 28 and battery 26. If the detector 28 in Steps S2 and S3 determines that the capacity of the battery 26 is insufficient to provide a satisfactory weld, the user is notified (Step S4) in the display 30 that he must use the AC source 34. If this is necessary, the user connects plug 32 to the AC source 34 and the weld is performed using power from the AC source 34. A switch SW1 illustrates the switching of DC battery power to the AC source 34. On the other hand, if the battery capacity is sufficient to provide a satisfactory weld, then the battery 26 in case 24 is used to complete the weld (Step S5).

Figure 2:
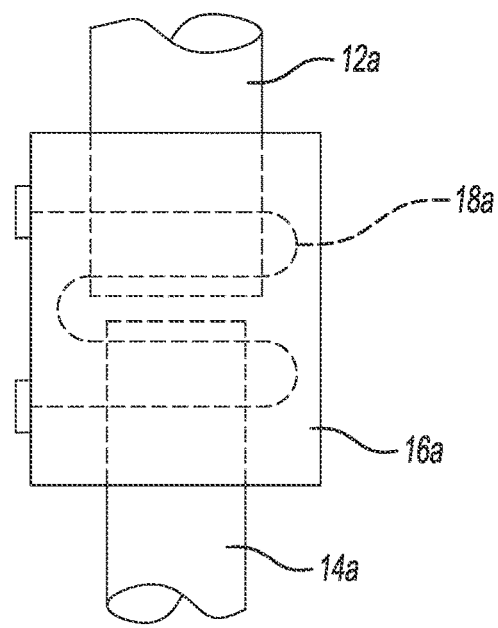
FIG. 2 is a partial plan view of a different electrofusion coupler for welding pipes of different sizes.
Figure 7:
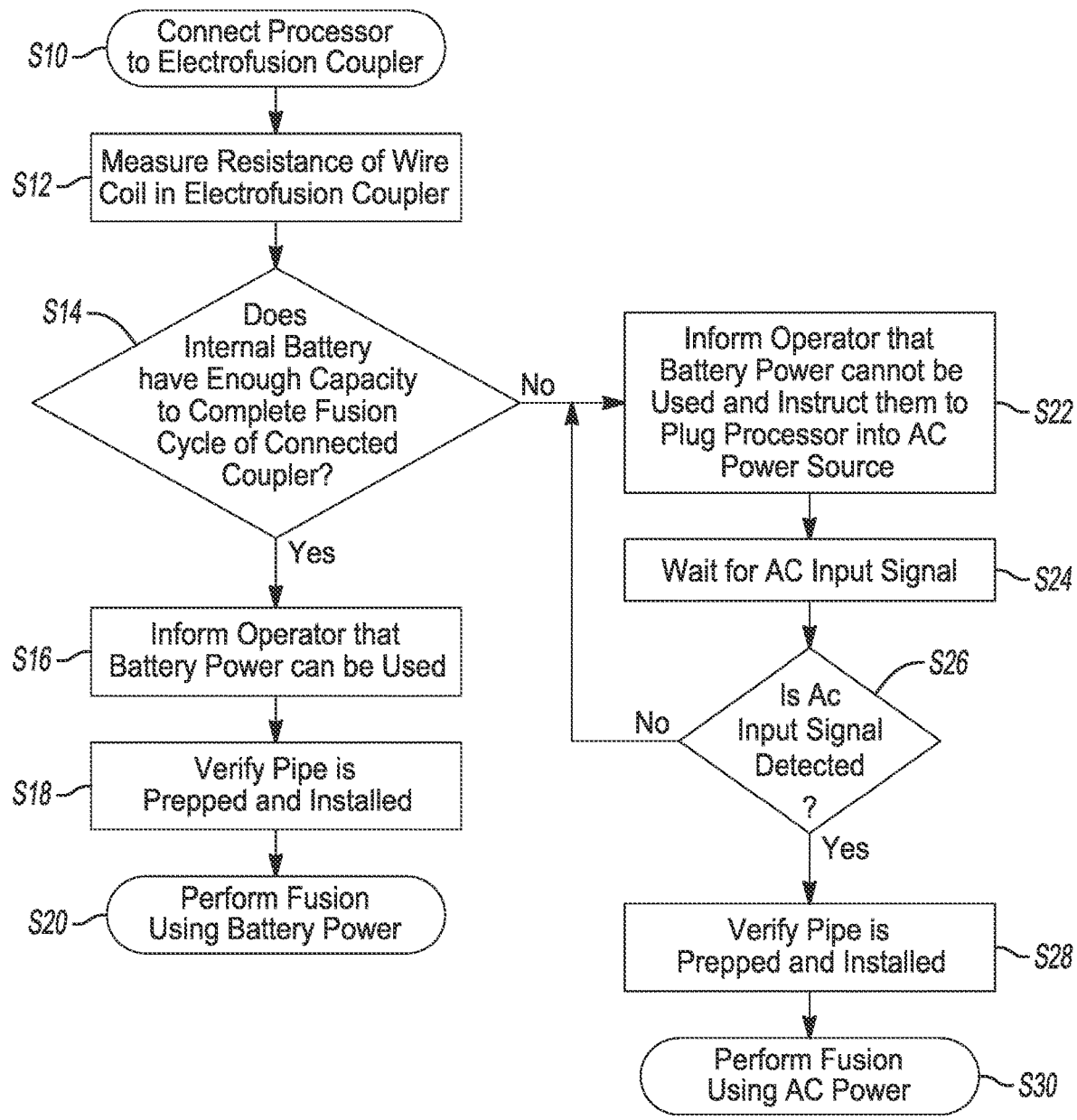
FIG. 7 is a more detailed flow chart of the sequence of operation in steps S10-S30 for the electrofusion processor.

A more detailed description of the operation of the electrofusion processor 10 is found in FIG. 7 and the following text. The electrofusion processor 10 can be used to weld pipes of different sizes or diameters. In FIG. 1 the coupler 16 can be assumed to be a 2-inch diameter coupler, whereas the coupler 16a in FIG. 2 is illustrated as a larger coupling, for example, an 8-inch diameter coupler.

Like step S1 in FIG. 6, step S10 in FIG. 7 calls for the user to connect the processor 10 to the coupler 16 or 16a (the term coupler is also sometimes referred to in the trade as a fitting). Then, in step S12 the detector 28 measures the resistance of the coil 18 or 18a in the coupler 16 or 16a. The resistance can be measured by a standard ohmmeter 28a which is part of the detector 28.

The following is a detailed example of the operation of the electrofusion processor 10 in connection with two different couplers 16 and 16a. The first example in the following steps 1a-1h is for a 2-inch coupling 16 whereas the second example in steps 2a-2h is for an 8-inch coupling 16a.

Detector Function Example
    Battery Capacity=300 Amp hour (ah)
    1. 2" Coupling
        1a. Coil resistance=3.550
        1b. Fusion voltage=40 volts
        1c. Fusion time=90 seconds=0.025 hr.

$$I(\text{Current}) = \frac{V \text{ (volts)}}{R \text{ (resistance)}}$$

$$I = \frac{40 \text{ v}}{3.55 \, \Omega}$$

1d. I=11.26 amps
1e. E (energy)=V(volts)*I(current)*t(time)
1f. E=(40 v)(11.26I)(0.025 hr.)
1g. E=11.26 Ah
1h. 11.26 Ah<300 Ah can use battery power
2. 8" Coupling
2a. Coil resistance=0.66Ω
2b. Fusion voltage=40 v
2c. Fusion time=500 seconds=0.139 hour
2d. I=40 v/0.66Ω
2e. I=60.61 amps
2f. E=(40 v) (60.61I)(0.139 hr.)
2g. E=336 Ah
2h. 336 Ah>300 Ah must use AC Input In the first example, it is known that the battery or fusion voltage is 40 V and, based on past experimentation, it is known that the fusion time for a 2-inch coupler is 90 seconds or 0.025 hours. Based on the calculations following step 1c, the detector 28 determines that 11.26 amp hours (Ah) of current I is available to be supplied by the battery 26. Then, detector 28 calculates in steps 1e-1i that 11.26 amp hours of energy E is required to perform a satisfactory weld. It is known that the battery 26 is rated to provide 300 Amp hour (ah) of energy. Therefore, the operator is informed on display 30 in step S16 that battery power can be used. The operator verifies that the pipe is prepped properly and installed in step S18 and then in step S20 the battery power is used to provide energy to the coil 18 in coupler 16 to perform a satisfactory weld.

In contrast, the detector 28 determines in similar steps 2a-2h that the battery 26 cannot provide sufficient energy to perform a satisfactory weld to the 8-inch coupler 16a. As a result, in step S22 the operator is informed by a message on the display 30 that battery power cannot be used and instructs the operator to plug the cable 32 from AC power source 34 into the input jack 25 on the case 24 of the electrofusion processor 10. The cable 32 typically will be a NEMA L5-30P type plug often used with portable AC generators. Energy from the AC power source 34 in step S30 is then used to provide a satisfactory weld to coupler 16a.

The foregoing description has been provided for purposes of illustration and description. Not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hybrid electrofusion processor comprising:
a battery;
leads configured to connect the battery to an electrofusion coupler for welding two plastic pipes;
a detector for sensing whether the battery can supply sufficient energy to the coupler to provide a satisfactory weld; the detector being configured to sense a resistance of a coil in the coupler prior to each weld;
an input for selectively receiving power from an alternating current (AC) power source, the input being a jack configured to receive a plug from the AC power source:
a display configured to warn a user to use power from the AC power source instead of the battery if the detector senses that the battery cannot supply sufficient energy to the coupler to provide a satisfactory weld;
a switch configured to connect the input from the jack for the AC power source, instead of the battery, to the leads in response to the detector sensing that the battery cannot supply sufficient energy to provide a satisfactory weld; and wherein
the processor is configured to weld couplers of different sizes, wherein:
the detector is configured to measure the resistance of a coil in a first coupler to determine whether the battery has sufficient energy to perform an acceptable weld on the first coupler solely with the battery power;
the detector being further configured to measure the resistance of a coil in a second coupler of a different size than the first coupler to determine whether the battery contained in the processor has sufficient energy to perform an acceptable weld on the second coupler solely with battery power; and
the processor being contained in a portable case having an input jack for receiving power from an external AC power source if it is determined that the battery does not have sufficient capacity to provide an acceptable weld for the first or second coupler.

2. The processor of claim 1 wherein the battery, leads, detector, input and display are contained in a portable case.

3. The processor of claim 1 wherein a given capacity of the battery is known and fusion time for the coupler of a given diameter is known, with the detector calculating, using the sensed coil resistance, to determine whether the battery has sufficient capacity to perform a satisfactory weld with only the battery power.

4. The processor of claim 1 wherein the jack is a NEMA L5-30P plug.

5. The processor of claim 1 wherein the detector is configured to determine resistances of couplers of different sizes.

6. The processor of claim 1 wherein the AC power source is a portable generator.

7. The processor of claim 1 which further comprises:
a pair of leads, the pair of leads being used to connect the first coupler or the second coupler to the portable case.

* * * * *